3,053,836
ACETALS AND KETALS OF 16α,17α-DIHYDROXYPROGESTERONES
Josef Fried, Princeton, N.J., assignor to Olin Mathieson Chemical Corporation, New York, N.Y., a corporation of Virginia
No Drawing. Filed July 14, 1961, Ser. No. 124,005
9 Claims. (Cl. 260—239.55)

This invention relates to, and has for its objects the provisions of a method of preparing physiologically active steroids, and to the physiologically active steroids produced thereby.

In my applications, Serial No. 24,230, filed April 25, 1960, and Serial No. 753,401, filed August 6, 1958, I describe various 16,17-cyclic acetal and ketal derivatives of steroids of the 16α,17α-dihydroxy-3,20-diketo-Δ⁴-pregnene series and disclose that these compounds are physiologically active substances which possess glucocorticoid and anti-inflammatory activities. I have now found that if the A-ring of such steroids is saturated, thereby yielding corresponding 16,17-cyclic acetal and ketal derivatives of steroids of the 16α,17α-dihydroxy-3,20-diketopregnane series, the topical anti-inflammatory activity of the starting Δ⁴-pregnene derivatives is surprisingly retained, although the systemic activity of these compounds is for all practical purposes eliminated. This discovery is unexpected, since a priori it would have been assumed that all anti-inflammatory activity, both systemic and topical, would be lost when the A-ring was saturated. Moreover, since the saturated pregnane steroids of this invention lack any significant systemic activity, they are compounds of choice for the topical treatment of such skin conditions as dermatitis, sunburn, neurodermatitis, eczema and anagenital pruritus. For these purposes they may be administered topically in the usual topically acceptable formulations, the dosage being adjusted for the relative activity of the particular steroid and the condition being treated.

Although the compounds of this invention include any 16,17-cyclic acetal or ketal of a 16α,17α-dihydroxy-3,20-diketopregnane steroid, the preferred compounds are those of the general formula

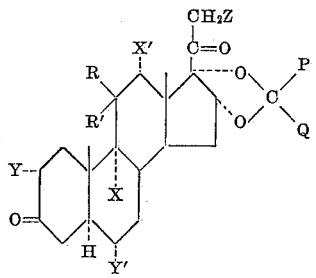

wherein R is hydrogen, R' is β-hydroxy, or together R and R' is keto; X and X' are hydrogen, chloro, fluoro and R' are keto; X and X' are hydrogen, chloro, fluoro or lower alkyl, at least one of the substituents X and X' being hydrogen or lower alkyl; Y is hydrogen or methyl; Y' is hydrogen, halogen (preferably chloro or fluoro) or lower alkyl (preferably methyl); Z is hydrogen, chloro, fluoro, hydroxy or acyloxy; P is hydrogen, lower alkyl, halo lower alkyl, carboxy lower alkyl (or a salt or ester thereof), monocyclic cycloalkyl, monocyclic aryl, monocyclic aryl lower alkyl, monocyclic heterocyclic or monocyclic heterocyclic lower alkyl; Q is lower alkyl, halo lower alkyl, carboxy lower alkyl (or a salt or ester thereof), monocyclic cycloalkyl, monocyclic aryl, monocyclic aryl lower alkyl, monocyclic heterocyclic or monocyclic heterocyclic lower alkyl; or together with the carbon to which they are joined P and Q are cycloalkyl or monocyclic heterocyclic. Particularly preferred are compounds wherein R is hydrogen, R' is β-hydroxy or together R and R' is keto; X is fluoro; X' is hydrogen; Y is hydrogen; Y' is hydrogen or fluoro; Z is hydroxy or acyloxy; and P and Q are each lower alkyl.

The compounds of this invention can be prepared in accordance with one method of this invention by hydrogenating the corresponding 16,17-cyclic acetal or cyclic ketal derivatives of 16α,17α-dihydroxy-3,20-diketo steroids of the Δ⁴-pregnene (including the Δ¹,⁴-pregnadiene and Δ¹,⁴,⁶-pregnatriene) series. Such starting steroids are disclosed in my applications, Serial No. 24,230, filed April 25, 1960, and Serial No. 753,401, filed August 6, 1958. The reduction is accomplished by treatment with hydrogen in the presence of a hydrogenation catalyst such as a noble metal catalyst (e.g., palladium on a carrier or ruthenium on a carrier). The amount of hydrogen which will be absorbed depends of course on whether a pregnene, pregnadiene or pregnatriene is employed as the starting steroid and also on whether any of the substituents in the acetal or ketal moiety are reduced. Thus, theoretically if a pregnene is used and the steroid contains no other reducible groups one mole of hydrogen is absorbed per mole of steroid; a pregnadiene uses two moles of hydrogen per mole of steroid; and a pregnatriene, three moles of hydrogen per mole of steroid. If, however, other reducible groups are present, such as nitro groups, then additional hydrogen must be used to affect complete reduction of the starting steroid to the desired product.

The compounds of this invention can also be prepared by catalytically reducing a free 16α,17α-dihydroxy-3,20-diketo steroid of the Δ⁴-pregnene (including the Δ¹,⁴-pregnadiene and Δ¹,⁴,⁶-pregnatriene) series and treating the corresponding 16α,17α-dihydroxy-3,20-diketo-5α-pregnane steroid formed with an aldehyde of at least two carbon atoms or a ketone. The reduction is accomplished under the conditions stated hereinbefore by treatment with hydrogen in the presence of a hydrogenation catalyst. The formation of the acetal or ketal is preferably carried out by treating a suspension or solution of the steroid in the aldehyde or ketone (or an organic solvent if the aldehyde or ketone is a solid) with an acid catalyst (e.g., perchloric acid, p-toluene sulfonic acid and hydrochloric acid), neutralizing the acid and recovering the cyclic acetal or ketal derivative formed. Particularly preferred as starting steroidal materials for this process are those of the general formula

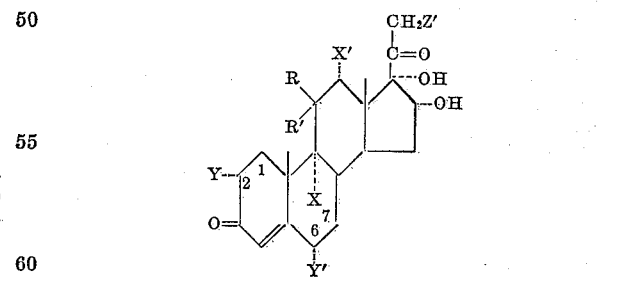

wherein the 1,2 and 6,7 positions are saturated or double-bonded and R, R', X, X', Y and Y' are as hereinbefore defined, and Z' is hydrogen, chloro, fluoro or hydroxy. Particularly preferred carbonyl reactants are those of the general formula:

wherein P and Q are as hereinbefore defined.
Among the suitable starting steroids utilizable in the first process of this invention may be mentioned the 16,17-cyclic acetals and ketals of:

16α-hydroxyhydrocortisone,
16α-hydroxycortisone,
16α-hydroxyprednisolone,
16α-hydroxyprednisone,
9α-halo-16α-hydroxyhydrocortisones (i.e., 9α-fluoro-16α-hydroxyhydrocortisone, 9α-chloro-16α-hydroxyhydrocortisone, 9α-bromo-16α-hydroxyhydrocortisone and 9α-iodo-16α-hydroxyhydrocortisone),
9α-halo-16α-hydroxycortisones,
9α-halo-16α-hydroxyprednisolone (e.g., triamcinolone),
9α-halo-16α-hydroxyprednisones,
12α-halo-16α-hydroxyhydrocortisones (e.g., 12α-fluoro-16α-hydroxyhydrocortisone),
12α-halo-16α-hydroxycortisones (e.g. 12α-chloro-16α-hydroxycortisone),
12α-halo-16α-hydroxyprednisolones (e.g. 12α-fluoro-16α-hydroxyprednisolone),
12α-halo-16α-hydroxyprednisones,
6α-methyl-16α-hydroxyhydrocortisone,
6α-methyl-16α-hydroxycortisone,
6α-methyl-16α-hydroxyprednisolone,
6α-methyl-16α-hydroxyprednisone,
2α-methyl-16α-hydroxyhydrocortisone,
2α-methyl-16α-hydroxycortisone,
2-methyl-16α-hydroxyprednisolone,
2-methyl-16α-hydroxyprednisone,
2α,6α-dimethyl-16α-hydroxyhydrocortisone,
2α,6α-dimethyl-16α-hydroxycortisone,
9α-halo-2-methyl-16α-hydroxy prednisolones (e.g. 2-methyltriamcinolone) 9α-halo-6α-methyl-16α-hydroxyhydrocortisones (e.g., 9α-fluoro-6α-methyl-16α-hydroxyhydrocortisone),
9α-halo-6α-methyl-16α-hydroxyprednisolones (e.g. 6α-methyl triamcinolone),
16α-hydroxy-6-dehydrocortisone,
16α-hydroxy-6-dehydrohydrocortisone,
16α-hydroxy-6-dehydroprednisolone,
9α-halo-16α-hydroxy-6-dehydroprednisolones,
11β,16α,17α-trihydroxyprogesterone,
11-keto-16α,17α-dihydroxyprogesterone,
11β,16α,17α-trihydroxy-1-dehydroprogesterone,
11-keto-16α,17α-dihydroxy-1-dehydroprogesterone,
9α-halo-11β,16α,17α-trihydroxyprogesterones (e.g. 9α-chloro-11β,16α,17α-trihydroxyprogesterone and 9α-fluoro-11β,16α,17α-trihydroxyprogesterone),
9α-halo-16α,17α-dihydroxy-11-keto-progesterones (e.g. 9α-fluoro-16α,17α-dihydroxy-11-ketoprogesterone),
9α-halo-11β,16α,17α-trihydroxy-1-dehydroprogesterones (e.g. 9α-fluoro-11β,16α,17α-trihydroxy-1-dehydroprogesterone),
12α-halo-11β,16α,17α-trihydroxyprogesterones (e.g. 12α-fluoro-11β,16α,17α-trihydroxyprogesterone),
12α-halo-11β,16α,17α-trihydroxy-1-dehydroprogesterones (e.g. 12α-fluoro-11β,16α,17α-trihydroxy-1-dehydroprogesterone),
21-halo-11β,16α,17α-trihydroxyprogesterones (e.g. 21-fluoro-11β,16α,17α-trihydroxyprogesterone),
21-halo-11β,16α,17α-trihydroxy-1-dehydroprogesterones,
9α,21-dihalo-11β,16α,17α-trihydroxyprogesterones (e.g. 9α,21-difluoro-11β,16α,17α-trihydroxyprogesterone),
9α,21-dihalo-6α-methyl-11β,16α,17α-trihydroxy-1-dehydroprogesterones,
16α-hydroxy-12α-(lower alkyl)hydrocortisones (e.g. 16α-hydroxy-12α-methylhydrocortisone),
16α-hydroxy-12α-(lower alkyl)-cortisones (e.g. 16α-hydroxy-12α-methylcortisone),
16α-hydroxy-9α-(lower alkyl)-hydrocortisones (e.g. 16α-hydroxy-9α-methylhydrocortisone),
16α-hydroxy-9α-(lower alkyl)cortisones (e.g. 16α-hydroxy-9α-methylcortisone),
16α-hydroxy-12α-(lower alkyl)prednisolone (e.g. 16α-hydroxy-12α-methylprednisolone),
16α-hydroxy-12α-(lower alkyl)-prednisones,
16α-hydroxy-9α-(lower alkyl)prednisolones (e.g. 16α-hydroxy-9α-methylprednisolone),
16α-hydroxy-9α-(lower alkyl)-prednisones,
12α-(lower alkyl)-11β,16α,17α-trihydroxyprogesterones (e.g. 12α-methyl-11β,16α,17α-trihydroxyprogesterone),
9α-(lower alkyl)-11β,16α,17α-trihydroxyprogesterones (e.g. 9α-methyl-11β,16α,17α-trihydroxyprogesterone),
12α-(lower alkyl)-11-keto-16α,17α-dihydroxyprogesterones,
9α-(lower alkyl)-11-keto-16α,17α-dihydroxyprogesterones,
12α-(lower alkyl)-$\Delta^{4,6}$-pregnadiene-11β,16α17α-triol-3,20-diones,
9α-(lower alkyl)-$\Delta^{4,6}$-pregnadiene-11β,16α-17α-triol,3,20-diones,
12α-(lower alkyl)-$\Delta^{1,4}$-pregnadiene-11β,16α,17α-triol-3,20-diones,
9α-(lower alkyl)-$\Delta^{1,4}$-pregnadiene-11β,16α,17α-triol-3,20-diones,
12α-(lower alkyl)-$\Delta^{1,4}$-pregnadiene-16α,17α-diol-3,11,20-triones,
6α-halo-16α-hydroxyhydrocortisones (e.g., 6α-fluoro-16α-hydroxyhydrocortisone and 6α-chloro-16α-hydroxyhydrocortisone),
6α-halo-16α-hydroxycortisones,
6α-halo-16α-hydroxyprednisolone,
6α-halo-16α-hydroxyprednisone,
6α,9α-dihalo-16α-hydroxyhydrocortisone (e.g. 6α,9α-difluoro-16α-hydroxyhydrocortisone),
6α,9α-dihalo-16α-hydroxycortisone,
6α,9α-dihalo-16α-hydroxyprednisolone (e.g. 6α,9α-difluoro-16α-hydroxyprednisolone),
6α,9α-dihalo-16α-hydroxyprednisone,
2α-methyl-6α-fluoro-16α-hydroxyhydrocortisone,
2α-methyl-6α-fluoro-16α-hydroxycortisone,
6α-fluoro-11β,16α,17α-trihydroxyprogesterone,
6α-fluoro-11-keto-16α,17α-dihydroxyprogesterone,
6α-fluoro-11β,16α,17α-trihydroxy-1-dehydroprogesterone,
6α-fluoro-11-keto-16α-17α-dihydroxy-1-dehydroprogesterone,
6α,9α-dihalo-11β,16α,17α-trihydroxyprogesterone (e.g. 6α,9α-difluoro-11β,16α,17α-trihydroxyprogesterone),
6α,9α-dihalo-11β,16α,17α-trihydroxy-1-dehydroprogesterone (e.g. 6α,9α-difluoro-11β,16α,17α-trihydroxy-1-dehydroprogesterone),
6α-halo-9α-(lower alkyl)-16α-hydroxyhydrocortisone (e.g. 6α-fluoro-9α-methyl-16α-hydroxyhydrocortisone),
6α-halo-9α-(lower alkyl)-16α-hydroxycortisone,
6α-halo-9α-(lower alkyl)-16α-hydroxyprednisolone,
6α-halo-9α-(lower alkyl)-16α-hydroxyprednisone
6α,9α-dihalo-12α-(lower alkyl)-16α-hydroxyhydrocortisone (e.g. 6α,9α-difluoro-12α-methyl-16α-hydroxyhydrocortisone),
6α,9α-dihalo-12α-(lower alkyl)-16α-hydroxycortisone,
6α,9α-dihalo-12α-(lower alkyl)-16α-hydroxyprednisolone (e.g. 6α-chloro-9α-fluoro-12α-methyl-16α-hydroxyprednisolone),
6α,9α-dihalo-12α-(lower alkyl)-16α-hydroxyprednisone, and
21-esters of those compounds containing a 21-hydroxy group;

with aldehydes of at least two carbon atoms and ketones. Suitable aldehydes and ketones include lower alkanals of at least two carbon atoms, such as paraldehyde, propanal, and hexanal; di(lower alkyl)ketones, such as acetone, diethylketone, dibutylketone, methylethylketone, and methylisobutylketone; cycloalkanones, such as cyclobutanone, cyclopentanone, cyclohexanone, surberone, and cyclodexanone; mono and dicycloalkyl ketones, such as cyclohexylmethylketone and dicyclopropylketone, halo-lower alkanals, such as chloral hydrate, trifluoroacetaldehyde hemiacetal, and heptafluorobutanal ethyl hemiacetal; halo-lower alkanones, such as 1,1,1-trifluoroacetone; monocyclic carboxylic aromatic aldehydes, such as benzaldehyde, halobenzaldehydes (e.g. p-chlorobenzaldehyde and p-fluorobenzaldehyde), lower alkoxybenzaldehydes (e.g. o-anisaldehyde), di(lower alkoxy)benzaldehydes (e.g. veratraldehyde), hydroxybenzaldehydes (e.g. salicylaldehyde), dihydroxybenzaldehydes (e.g. resorcylaldehyde), lower alkyl benzaldehydes (e.g. m-tolualdehyde and p-ethylbenzaldehyde), di(lower alkyl)benzaldehydes (e.g. o,p-dimethylbenzaldehyde), nitrobenzaldehydes, acylaminobenzaldehydes (e.g. N-acetylanthranilaldehyde), and cyanobenzaldehydes; monocyclic carbocyclic aromatic lower alkanals, such as phenylacetaldehyde, α-phenylpropionaldehyde, β-phenylpropionaldehyde α-phenylbutyraldehyde, and aromatically-substituted halo, lower alkoxy, hydroxy, lower alkyl, nitro, acylamido and cyano derivatives thereof; monocyclic heterocylic aldehydes, such as picolinaldehydes, furfural, thiophene carbonals, and halo, lower alkoxy, hydroxy, lower alkyl, nitro, and cyano derivatives thereof; monocyclic heterocyclic lower alkanals; 1-(monocyclic carbocyclic aromatic) substituted lower alkanals, such as acetophenone, α,α,α-trifluoroacetophenone, propiophenone, butyrophenone, valerophenone, isocaprophenone, halophenyl lower alkyl ketones (e.g. p-chloroacetophenone and p-chloropropiophenone), (lower alkoxy)phenyl lower alkyl ketones (e.g. p-anisyl methyl ketone), di(lower alkoxy)phenyl lower alkyl ketones, hydroxy-phenyl lower alkyl ketones, dihydroxyphenyl lower alkyl ketones (e.g. resacetophenone), (lower alkyl)phenyl lower alkyl ketones (e.g. methyl p-tolyl ketone), di(lower alkyl)-phenyl lower alkyl ketones (o,p-xylyl methyl ketone), nitrophenyl lower alkyl ketones (e.g. p-nitroacetophenone), acylamidophenyl lower alkyl ketones (e.g. acetyl aniline, and cyanophenyl lower alkyl ketones; benzophenone, and mono or bis substituted halo, lower alkoxy, hydroxy, lower alkyl, nitro, acylamido and cyano derivatives thereof; monocyclic carbocyclic aromatic lower alkanones, such as 1-phenyl-3-butanone and 1-phenyl-4-pentanone, and aromatically substituted derivatives thereof; 1-(monocyclic heterocyclic) substituted lower alkanals, such as 2-acetylfuran, 2-benzoylfuran, and 2-acetyl-thiophene; oxo substituted monocyclic heterocyclics, such as monocyclic heterocyclic lower alkanones; and oxo lower alkanoic acids such as glyoxylic, pyruvic, acetoacetic, β-ketopropionic, α-ketobutyric, levulinic, β-ketocaproic and β-ketocaprylic acid [as well as salts and esters thereof, such as lower alkyl esters (e.g. methyl and ethyl)].

Among the suitable 21-esters can be mentioned those which are formed with the acyl radical of: (a) a hydrocarbon monocarboxylic acid of less than twelve carbon atoms, such as an alkanoic acid (e.g., acetic, propionic, tert.-pentanoic, enanthic, and undecanoic acid), a monocyclic aryl carboxylic acid (e.g., benzoic and toluic acid), a monocyclic aryl lower alkanoic acid (e.g., phenacetic and β-phenylpropionic acid), a lower alkenoic acid, (e.g. undecanoic acid), a cycloalkane carboxylic acid, or a cycloalkenecarboxylic acid; (b) a hydrocarbon dicarboxylic acid of less than twelve carbon atoms, such as a lower alkanedioic acid (e.g., oxalic, malonic, succinic, glutaric, adipic, pimelic, suberic, azelaic and sebacic acid), a lower alkenedioic acid (e.g., maleic, fumaric and citraconic acid), a cycloalkanedioic acid, a cycloalkenedioic acid, and a monocyclic aromatic dicarboxylic acid (e.g., the phthalic acids), as well as salts thereof with suitable bases such as inorganic bases, such as ammonium hydroxide, the alkali metal hydroxides (e.g., potassium hydroxide and sodium hydroxide) and the alkaline earth metal hydroxides; and organic bases, such as di(lower alkyl)amines and heterocyclic amines (e.g., pyridine); and (c) phosphoric acid.

All such starting steroids can be prepared by methods disclosed in my said applications, Serial Nos. 24,230 and 753,401.

The 21-esters can also be prepared from the corresponding 21-hydroxy-5α-pregnanes by treatment of the latter with an acyl halide (preferably acyl chloride) or acid anhydride of one of the hydrocarbon monocarboxylic acids of less than twelve carbon atoms mentioned hereinbefore, one of the hydrocarbon dicarboxylic acids of less than twelve carbon atoms mentioned hereinbefore, or phosphoric acid, the reaction being conducted under the usual acylating conditions.

Among the suitable starting steroids utilizable in the second process of this invention may be mentioned the free 16α, 17α-dihydroxy steroids of the $\Delta^4$-pregnene (including $\Delta^{1,4}$-pregnadiene and $\Delta^{1,4,6}$-pregnatriene) series listed hereinbefore. The preparation of such steroids is disclosed in my said applications, Serial Nos. 24,230 and 753,401, or in the prior art.

Among the suitable aldehydes and ketones which can be used in the second process of this invention may be mentioned those aldehydes and ketones specifically listed hereinbefore.

The following examples illustrate the invention (all temperatures being in centigrade):

EXAMPLE 1

9α-Fluoro-16α,17α-Isopropylidenedioxy-5α-Pregnane-11β,21-Diol-3,20-Dione

A suspension of 3 g. of 5% palladium on barium sulfate in 100 ml. of ethyl acetate is agitated in an atmosphere of hydrogen until hydrogen is no longer absorbed (120 ml.). To this suspension is added a suspension of 10 g. of triamcinolone 16,17-acetonide in 900 ml. of ethyl acetate and the mixture agitated until hydrogen is no longer absorbed (1200 ml.). Filtration of an aliquot and evaporation to dryness furnishes material which shows an $$E_{1cm.}^{1\%}$$

of 18.4 at 238 mμ indicating the presence of unreduced triamcinolone acetonide. The total mixture is therefore filtered, washed well with ethyl acetate and hydrogenated again for 24 hours with 3 g. of fresh palladium on barium sulfate catalyst. Eighty-seven milliliters of hydrogen are taken up. The mixture is filtered and the solvent removed, in vacuo. The ultraviolet spectrum of this material has $$E_{1cm.}^{1\%}$$

of 2.5 at 296 mμ and a minimum at 238 mμ. The crude residue on recrystallization from acetone-hexane furnishes analytically pure material in almost uantitative yield possessing the following properties: M.P. about 211–213° and 240–243°; $[\alpha]_D^{23}+77°$ (c., .66 in chlf.)

$\lambda_{max.}^{Nujol}$ 2.70, 2.89, 3.05, 5.76, 5.85μ; $\lambda_{max.}^{alc.}$ 296 mμ ($E_{1cm.}^{1\%}$ 2.48)

Analysis.—Calcd. for $C_{24}H_{37}O_6F$ (440.53): C, 65.43; H, 8.46. Found: C, 65.44; H, 8.08.

EXAMPLE 2

Following the procedure of Example 1 but substituting 10 g. of 9α-fluoro-16α-hydroxyhydrocortisone 16,17-acetonide for the triamcinolone acetonide, the same product is formed in quantitative yield.

EXAMPLE 3

Following the procedure of Example 1 but substituting 10 g. of 9α-fluoro-$\Delta^{1,4,6}$-pregnatriene-11β,16α,17α-21-tetrol-3,20-dione 16,17-acetonide for the triamcinolone acetonide, the same product is formed.

EXAMPLE 4

9α-Fluoro-16α,17α-(2′-Butylidenedioxy)-5α-Pregnane-11β,21-diol-3,20-Dione

Following the procedure of Example 1 but substituting 10 g. of 16α,17α-(2′-butylidene) triamcinolone for the triamcinolone acetonide, 9α-fluoro-16α,17α-(2′-butylidenedioxy)-5α-pregnane-11β,21-diol-3,20-dione is obtained.

EXAMPLE 5

*9α-Fluoro-16α,17α-(4'-Methyl-2'-Pentylidenedioxy)-5α-Pregnane-11β,21-Diol-3,20-Dione*

Following the procedure of Example 1 but substituting 10 g. of 16α,17α-(4'-methyl-2'-pentylidene) triamcinolone for the triamcinolone acetonide, 9α-fluoro-16α,17α-(4'-methyl-2'-pentylidenedioxy)-5α-pregnane - 11β,21-diol-3,20-dione is obtained.

EXAMPLE 6

*9α-Fluoro-16α,17α-Cyclohexylidenedioxy-5α-Pregnane-11β,21-Diol-3,20-Dione*

Following the procedure of Example 1 but substituting 10 g. of 16α,17α-cyclohexylidene triamcinolone for the triamcinolone acetonide, 9α-fluoro-16α,17α-cyclohexylidenedioxy-5α-pregnene-11β,21-diol-3,20-dione is obtained.

EXAMPLE 7

*9α-Fluoro-16α,17α-(3'-Pentylidenedioxy)-5α-Pregnane-11β,21-Diol-3,20-dione*

Following the procedure of Example 1 but substituting 10 g. of 16α,17α-(3'-pentylidene) triamcinolone for the triamcinolone acetonide, 9α-fluoro-16α,17α-(3'-pentylidenedioxy)-5α-pregnane-11β,21-diol - 3,20 - dione is obtained.

EXAMPLE 8

*9α-Fluoro-16α,17α-Ethylidenedioxy-5α-Pregnane-11β,21-Diol-3,20-Dione*

Following the procedure of Example 1 but substituting 10 g. of 16α,17α-ethylidene triamcinolone for the triamcinolone acetonide, 9α-fluoro-16α-17α-ethylidenedioxy-5α-pregnane-11β,21-diol-3,20-dione is obtained.

EXAMPLE 9

*9α-Fluoro-16α,17α-Isopropylidenedioxy-5α-Pregnane-21-Ol-3,11,20-Trione*

Following the procedure of Example 1 but substituting 10 g. of 9α-fluoro-16α-hydroxycortisone 16,17-acetonide for the triamcinolone acetonide, 9α - fluoro-16α,17α-isopropylidenedioxy-5α-pregnane-21-ol-3,11,20-trione is obtained.

EXAMPLE 10

*16α,17α-Cyclohexylidenedioxy-5α-Pregnane-11β,21-Diol-3,20-Dione*

Following the procedure of Example 1 but substituting 10 g. of 16α,17α-cyclohexylidene-16α-hydroxyhydrocortisone for the triamcinolone acetonide, 16α,17α-cyclohexylidenedioxy-5α-pregnane-11β-21-diol-3,20 - dione is obtained.

Similarly, 16α,17α-cyclohexylidene 16α-hydroxycortisone yields 16α,17α - cyclohexylidenedioxy-5α-pregnane-21-ol-3,11,20-trione.

EXAMPLE 11

*16α,17α-Isopropylidenedioxy-5α-Pregnane-11β,21-Diol-3,20-Dione*

Following the procedure of Example 1 but substituting 10 g. of 16α,17α-isopropylidene 16α-hydroxyprednisolone for the triamcinolone acetonide, 16α,17α-isopropylidenedioxy-5α-pregnane-11β,21-diol-3,20-dione is obtained.

EXAMPLE 12

*16α,17α-(3'-Pentylidenedioxy)-12α-Chloro-5α-Pregnane-21-Ol-3,11,20-Trione*

Following the procedure of Example 1 but substituting 10 g. of 16α,17α-(3'-pentylidene) 12α-chloro-16α-hydroxycortisone for the triamcinolone acetonide, 16α,17α-(3'-pentylidenedioxy) - 12α - chloro - 5α-pregnane-21-ol-3,11,20-trione is obtained.

EXAMPLE 13

*16α,17α-Isopropylidenedioxy-12α-Fluoro-5α-Pregnane 11β,21-Diol-3,20-Dione*

Following the procedure of Example but substituting 10 g. of 16α,17α-isopropylidene 16α-hydroxy-12α-fluorohydrocortisone for the triamcinolone acetonide, 16α,17α-isopropylidenedioxy - 12α-fluoro-5α-pregnane-11β,21-diol-3,20-dione is obtained.

EXAMPLE 14

*12α-Fluoro-16α,17α-Isopropylidenedioxy-5α-Pregnane-11β-Ol-3,20-Dione*

Following the procedure of Example 1 but substituting 10 g. of 16α,17α-isopropylidene 12α-fluoro-Δ⁴-pregnene-11β,16α,17α-triol-3,20-dione for the triamcinolone acetonide, 12α-fluoro-16α17α-isopropylidenedioxy-5α-pregnane-11β-ol-3,20-dione is obtained.

EXAMPLE 15

*16α,17α-(3'-Pentylidenedioxy)-12α-Chloro-5α-Pregnane-11β-Ol-3,20-Dione*

Following the procedure of Example 1 but substituting 10 g. of 16α,17α-isopropylidene 9α-fluoro-Δ⁴-pregnene-11β,16α,17α-triol-3,20-dione for the triamcinolone acetonide, 9α - fluoro - 16α,17α - isopropylidene-dioxy-5α-pregnane-11β-ol-3,20-dione is obtained.

EXAMPLE 16

*6α-Methyl-16α,17α-Isopropylidenedioxy-5α-Pregnane-11β,21-Diol-3,20-Dione*

Following the procedure of Example 1 but substituting 10 g. of 16α,17α-isopropylidene 6α-methyl-16α-hydroxyprednisolone for the triamcinolone acetonide, 6α-methyl-16α,17α - isopropylidenedioxy - 5α-pregnane-11β,21-diol-3,20-dione is obtained.

EXAMPLE 17

*6α-Methyl-9α-Fluoro-16α,17α-Isopropylidenedioxy-5α-Pregnane-11β,21-Diol-3,20-Dione*

Following the procedure of Example 1 but substituting 10 g. of 16α,17α-isopropylidene 6α-methyl-9α-fluoro-16α-hydroxyprednisolone for the triamcinolone acetonide, 6α-methyl - 9α - fluoro-16α,17α-isopropylidenedioxy-5α-pregnane-11β,21-diol-3,20-dione is obtained.

EXAMPLE 18

*Acetophenone Derivative of 9α-Fluoro-5α-Pregnane-11β,16α,17α,21-Tetrol-3,20-Dione*

Following the procedure of Example 1 but substituting 10 g. of the acetophenone derivative of triamcinolone for the triamcinolone acetonide, the acetophenone derivative of 9α-fluoro-5α-pregnane-11β,16α,17α,21-tetrol-3,20-dione is obtained.

EXAMPLE 19

*p-Aminoacetophenone Derivative of 9α-Fluoro-5α-Pregnane-11β,16α,17α,21-Tetrol-3,20-Dione*

Following the procedure of Example 1 but substituting 10 g. of the p-nitroacetophenone derivative of triamcinolone for the triamcinolone acetonide, the p-aminoacetophenone derivative of 9α-fluoro-5α-pregnane-11β,16α,17α,21-tetrol-3,20-dione is obtained.

EXAMPLE 20

*Acetophenone Derivative of 9α-Fluoro-5α-Pregnane-16α,17α,21-Triol-3,11,20-Trione*

Following the procedure of Example 1 but substituting 10 g. of the acetophenone derivative of 9α-fluoro-16α-hydroxycortisone for the triamcinolone acetonide, the acetophenone derivative of 9α-fluoro-5α-pregnane-16α,17α,21-triol-3,11,20-trione is obtained.

EXAMPLE 21

*Benzaldehyde Derivative of 5α-Pregnane-11β,16α,17α,21-Tetrol-3,20-Dione*

Following the procedure of Example 1 but substituting 10 g. of the benzaldehyde derivative of 16α-hydroxyhydrocortisone for the triamcinolone acetonide, the benzaldehyde derivative of 5α-pregnane -11β,16α,17α,21-tetrol-3,20-dione is obtained.

EXAMPLE 22

*Furfural Derivative of 5α-Pregnane-11β,16α,17α,21-Tetrol-3,20-Dione*

Following the procedure of Example 1 but substituting 10 g. of the furfural derivative of 16α-hydroxyprednisolone for the triamcinolone acetonide, the furfural derivative of 5α-pregnane-11β,16α,17α,21-tetrol-3,20-dione is obtained.

EXAMPLE 23

*Benzophenone Derivative of 12α-Chloro-5α-Pregnane-16α,17α,21-Triol-3,11,20-Trione*

Following the procedure of Example 1 but substituting 10 g. of the benzophenone derivative of 12α-chloro-16α-hydroxycortisone for the triamcinolone acetonide, the benzophenone derivative of 12α-chloro-5α-pregnane-16α,17α,21triol-3,11,20-trione is obtained.

EXAMPLE 24

*Acetophenone Derivative of 12α-Fluoro-5α-Pregnane-11β,16α,17α,21-Tetrol-3,20-Dione*

Following the procedure of Example 1 but substituting 10 g. of the acetophenone derivative of 12α-fluoro-16α-hydroxyhydrocortisone for the triamcinolone acetonide, the acetophenone derivative of 12α-fluoro-5α-pregnane-11β,16α,21-tetrol-3,20-dione is obtained.

EXAMPLE 25

*2-Acetylfuran Derivative of 12α-Fluoro-5α-Pregnane-11β,16α,17α,21-Tetrol-3,20-Dione*

Following the procedure of Example 1 but substituting 10 g. of the 2-acetylfuran derivative of 12α-fluoro-16α-hydroxyprednisolone for the triamcinolone acetonide, the 2-acetylfuran derivative of 12α-fluoro-5α-pregnane-11β,16α,17α,21-tetrol-3,20-dione is obtained.

EXAMPLE 26

*p-Aminoacetophenone Derivative of 9α-Fluoro-5α-Pregnane-11β,16α,17α,Triol-3,20-Dione*

Following the procedure of Example 1 but substituting 10 g. of the p-nitroacetophenone derivative of 9α-fluoro-Δ⁴-pregnene-11β,16α,17α-triol-3,20-dione for the triamcinolone acetonide, the p-aminoacetophenone derivative of 9α-fluoro-5α-pregnane-11β,16α,17α-triol-3,20-dione is obtained.

EXAMPLE 27

*Acetophenone Derivative of 6α-Methyl-5α-Pregnane-11β,16α,17α,21-Tetrol-3,20-Dione*

Following the procedure of Example 1 but substituting 10 g. of the acetophenone derivative of 6α-methyl-16α-hydroxyprednisolone for the triamcinolone acetonide, the acetophenone derivative of 6α-methyl-5α-pregnane-11β,16α,17α,21-tetrol-3,20-dione is obtained.

EXAMPLE 28

*Acetophenone Derivative of 9α-Fluoro-6α-Methyl-5α-Pregnane-11β,16α,17α,21-Tetrol-3,20-Dione*

Following the procedure of Example 1 but substituting 10 g. of acetophenone derivative of 9α-fluoro-6α-methyl-16α-hydroxyprednisolone for the triamcinolone acetonide, the acetophenone derivative of 9α-fluoro-6α-methyl-5α pregnane-11β,16α,17α,21-tetrol-3,20-dione is obtained.

EXAMPLE 29

*9α-Chloro-16α,17α-Isopropylidenedioxy-5α-Pregnane-11β-Ol-3,20-Dione*

Following the procedure of Example 1 but substituting 10 g. of 16α,17α-isopropylidene 9α-chloro-11β,16α,17α-trihydroxyprogesterone for the triamcinolone acetonide, 9α-chloro-16α,17α-isopropylidenedioxy-5α-pregnane - 11β-ol-3,20-dione is obtained.

EXAMPLE 30

*9α-Fluoro-16α,17α-Isopropylidenedioxy-5α-Pregnane-3,11,20-Trione*

Following the procedure of Example 1 but substituting 10 g. of 16α,17α-isopropylidene 9α-fluoro-Δ⁴-pregnene-16α,17α-diol-3,11,20-trione for the triamcinolone acetonide, 9α,fluoro-16α,17α-isopropylidenedioxy - 5α-pregnane-3,11,20-trione is obtained.

EXAMPLE 31

*9α-Chloro-16α,17α-Isopropylidenedioxy-5α-Pregnane-3,11,20-Trione*

Following the procedure of Example 1 but substituting 10 g. of 16α,17α-isopropylidene 9α-chloro-Δ⁴-pregnene-16α,17α-diol-3,11,20-trione for the triamcinolone acetonide, 9α-chloro-16α,17α-isopropylidenedioxy-5α-pregnane-3,11,20-trione is obtained.

EXAMPLE 32

*16α,17α-Chloral Derivative of 9α-Fluoro-5α-Pregnane-11β,16α,17α,21-Tetrol-3,20-Dione*

Following the procedure of Example 1 but substituting 10 g. of the 16α,17α-chloral derivative of triamcinolone for the triamcinolone acetonide, the 16α,17α-chloral derivative of 9α-fluoro-5α-pregnane-11β,16α17α,21-tetrol-3,20-dione is obtained.

EXAMPLE 33

*Trifluoroacetonide of 9α-Fluoro-5α-Pregnane-11β,16α,17α,21-Tetrol-3,20-Dione*

Following the procedure of Example 1 but substituting 10 g. of the trifluoroacetonide of triamcinolone for the triamcinolone acetonide, the trifluoroacetonide of 9α-fluoro-5α-pregnane-11β,16α,17α,21-tetrol-3,20-dione is obtained.

EXAMPLE 34

*16α,17α-Chloral Derivative of 9α-Fluoro-5α-Pregnane-16α,17α,21-Triol-3,11,20-Trione*

Following the procedure of Example 1 but substituting 10 g. of the 16α,17α-chloral derivative of 9α-fluoro-16α-hydroxycortisone for the triamcinolone acetonide, the 16,17-chloral derivative of 9α-fluoro-5α-pregnane-16α,17α,21-triol-3,11,20-trione is obtained.

EXAMPLE 35

*1,1,1-Trifluoroacetonide of 5α-Pregnane-11β,16α,17α,21-Tetrol-3,20-Dione*

Following the procedure of Example 1 but substituting 10 g. of 1,1,1-trifluoroacetonide of 16α-hydroxyhydrocortisone for the triamcinolone acetonide, 1,1,1-trifluoroacetonide of 5α-pregnane-11β,16α,17α,21-tetrol-3,20-dione is obtained.

EXAMPLE 36

*Heptafluorobutanal Derivative of 9α-Fluoro-5α-Pregnane-11β,16α,17α,21-Tetrol-3,20-Dione*

Following the procedure of Example 1 but substituting 10 g. of the heptafluorobutanal derivative of trimacinolone for the triamcinolone acetonide, the heptafluorobutanal derivative of 9α-fluoro-5α-pregnane-11β,16α,17α,21-tetrol-3,20-dione is obtained.

EXAMPLE 37

*16α,17α-Chloral Derivative of 12α-Chloro-5α-Pregnane-16α,17α,21-Triol-3,11,20-Trione*

Following the procedure of Example 1 but substituting 10 g. of the 16α,17α-chloral derivative of 12α-chloro-16α, hydroxycortisone for the triamcinolone acetonide, the 16α, 17α-chloral derivative of 12α - chloro - 5α-pregnane-16α 17α,21-triol-3,11,20-trione is obtained.

EXAMPLE 38

*16α,17α-Chloral Derivative of 12α-Fluoro-5α-Pregnane-11β,16α,17α,21-Tetrol-3,20-Dione*

Following the procedure of Example 1 but substituting 10 g. of the 16α,17α-chloral derivative of 12α-fluoro-16α-hydroxy hydrocortisone for the triamcinolone acetonide, the 16α,17α-chloral derivative of 12α-fluoro-5α-pregnane-11β,16α,17α,21-tetrol-3,20-dione is obtained.

EXAMPLE 39

*16α,17α-Chloral Derivative of 12α-Fluoro-5α-Pregnane-11β,16α,17α-Triol-3,20-Dione*

Following the procedure of Example 1 but substituting 10 g. of the 16α,17α-chloral derivative of 12α-fluoro-Δ⁴-pregnene-11β,16α,17α-triol-3,20-dione for the triamcinolone acetonide, the 16α,17α, chloral derivative of 12α-fluoro-5α-pregnane-11β,16α,17α-triol-3,20 dione is obtained.

EXAMPLE 40

*1,1,1-Trifluoroacetonide of 6α-Methyl-5α-Pregnane-11β,16α,17α,21-Tetrol-3,20-Dione*

Following the procedure of Example 1 but substituting 10g. of 6α-methyl-16α-hydroxyprednisolone 1,1,1-trifluoroacetonide for the triamcinolone acetonide, the 1,1,1-trifluoroacetonide of 6α-methyl-5α-pregnane-11β,16α,17α, 21-tetrol-3,20-dione is obtained.

EXAMPLE 41

*1,1,1-Trifluoroacetonide of 6α-Methyl-9α-Fluoro-5α-Pregnane-11β,16α,17α,21-Tetrol-3,20-Dione*

Following the procedure of Example 1 but substituting 10g. of 9α-fluoro-6α-methyl-16α-hydroxyprednisolone 1, 1,1-trifluoroacetonide for the triamcinolone acetonide, the 1,1,1-trifluoroacetonide of 6α-methyl-9α-fluoro-5α-pregnane-11β,16α,17α,21-tetrol-3,20-dione is obtained.

EXAMPLE 42

*9α-Methyl-16α,17α-Isopropylidenedioxy-5α-Pregnane-11β,21-Diol-3,20-Dione*

Following the procedure of Example 1 but substituting 10 g. of 16α,17α-isopropylidene 9α-methyl-16α-hydroxyprednisolone for the triamcinolone acetonide, 9α-methyl-16α,17α-isopropylidenedioxy-5α - pregnane - 11β,21-diol-3,20-dione is obtained.

EXAMPLE 43

*12α-Methyl-16α,17α-Isopropylidenedioxy-5α-Pregnane-11β,21-Diol-3,20-Dione*

Following the procedure of Example 1 but substituting 10g. of 16α,17α-isopropylidene 12α-methyl-16α-hydroxyprednisolone for the triamcinolone acetonide, 12α-methyl-16α,17α-isopropylidenedioxy-5α - pregnane - 11β,21-diol-3,20-dione is obtained.

EXAMPLE 44

*9α-Mehtyl-16α,17α(2'-Butylidenedioxy)-5α-Pregnane-21-Ol-3,11,20-Trione*

Following the procedure of Example 1 but substituting 10 g. of 16α,17α-(2'-butylidene) 9α-methyl-16α-hydroxycortisone for the triamcinolone acetonide 9α-methyl-16α, 17α-(2'-butylidenedioxy)-5α-pregnane - 21-ol-3,11,20-trione is obtained.

EXAMPLE 45

*9α-Methyl-16α17α-Cyclohexylidenedioxy-5α-Pregnane-11β,21-Diol-3,20-Dione*

Following the procedure of Example 1 but substituting 10g. of 16α,17α-cyclohexylidene 9α-methyl-16α-hydroxyprednisolone for the triamcinolone acetonide, 9α-methyl-16α,17α-cyclohexylidene-dioxy-5α-pregnane-11β,21 - diol-3,20-dione is obtained.

EXAMPLE 46

*12α-Methyl-16α,17α-(3'-Pentylidenedioxy)-5α-Pregnane-11β,21-Diol-3,20-Dione*

Following the procedure of Example 1 but substituting 10 g. of 16α,17α-(3'-pentylidene) 12α-methyl-16α-hydroxyprednisolone for the triamcinolone acetonide, 12α-methyl-16α,17α-(3'-pentylidenedioxy) - 5α-pregnane-11β, 21-diol-3,20-dione is obtained.

EXAMPLE 47

*9α-Methyl-16α,17α-Ethylidenedioxy-5α-Pregnane-11β, 21-Diol-3,20-Dione*

Following the procedure of Example 1 but substituting 10 g. of 16α,17α-ethylidene 9α-methyl-16α-hydroxyprednisolone for the triamcinolone acetonide, 9α-methyl-16α, 17α-ethylidenedioxy-5α-pregnane-11β,21 - diol-3,20-dione is obtained.

EXAMPLE 48

*12α-Methyl-16α,17α-Isopropylidenedioxy-5α-Pregnane-11β-Ol-3,20-Dione*

Following the procedure of Example 1 but substituting 10 g. of 16α,17α-isopropylidene 12α-methyl-Δ⁴-pregnene-11β,16α,17α-triol-3,20-dione for the triamcinolone acetonide, 12α-methyl-16α,17α-isopropylidenedioxy - 5α - pregnane-11β-ol-3,20-dione is obtained.

EXAMPLE 49

*Acetophenone Derivative of 9α-Methyl-5α-Pregnane-11β,16α,17α,21-Tetrol-3,20-Dione*

Following the procedure of Example 1 but substituting 10g. of the acetophenone derivative of 9α-methyl-16α-hydroxyprednisolone for the triamcinolone acetonide, the acetophenone derivative of 9α-methyl-5α-pregnane-11β, 16α,17α,21-tetrol-3,20-dione is obtained.

EXAMPLE 50

*Acetophenone Derivative of 9α-Methyl-5α-Pregnane-11β,16α,17α,21-Tetrol-3,20-Dione 21-Acetate*

Following the procedure of Example 1 but substituting 10 g. of the acetophenone derivative of 9α-methyl-16α-hydroxyprednisolone 21-acetate for the triamcinolone acetonide, the acetophenone derivative of 9α-methyl-5α-pregnane-11β,16α,21-tetrol-3,20-dione 21-acetate is obtained.

EXAMPLE 51

*Benzaldehyde Derivative of 9α-Methyl-5α-Pregnane-11β, 16α,17α, 21-Tetrol-3,20-Dione*

Following the procedure of Example 1 but substituting 10 g. of the benzaldehyde derivative of 9α-methyl-16α-hydroxyhydrocortisone for the triamcinolone acetonide, the benzaldehyde derivative of 9α-methyl-5α-pregnane-11β,16α,17α,21-tetrol-3,20-dione is obtained.

EXAMPLE 52

*Furfural Derivative of 12α-Methyl-5α-Pregnane-11β, 16α,17α,21-Tetrol 3,20-Dione*

Following the procedure of Example 1 but substituting 10 g. of the furfural derivative of 12α-methyl-16α-hydroxyprednisolone for the triamcinolone acetonide, the furfural derivative of 12α-methyl-5α-pregnane-11β,16α,17α,21-tetrol-3,20-dione is obtained.

EXAMPLE 53

*Benzophenone Derivative of 12α-Methyl-5α-Pregnane-16α,17α,21-Triol-3,11,20-Trione*

Following the procedure of Example 1 but substituting 10 g. of the benzophenone derivative of 12α-methyl-16α-hydroxycortisone for the triamcinolone acetonide, the benzophenone derivative of 12α-methyl-5α-pregnane-16α,17α,21-triol-3,11,20-trione is obtained.

EXAMPLE 54

*2-Acetylfuran Derivative of 12α-Methyl-5α-Pregnane-11β,16α,17α,21-Tetrol-3,20-Dione*

Following the procedure of Example 1 but substituting 10 g. of the 2-acetylfuran derivative of 12α-methyl-16α-hydroxyprednisolone for the triamcinolone acetonide, the 2-acetylfuran derivative of 12α-methyl-5α-pregnane-11β,16α,17α,21-tetrol-3,20-dione is obtained.

EXAMPLE 55

*Ethyl Levulinate Derivative of 9α-Fluoro-5α-Pregnane-11β,16α,17α,21-Tetrol-3,20-Dione*

Following the procedure of Example 1 but substituting 10 g. of the ethyl levulinate derivative of triamcinolone for the triamcinolone acetonide, the ethyl levulinate derivative of 9α-fluoro-5α-pregnane-11β,16α,17α,21-tetrol-3,20-dione is obtained.

EXAMPLE 56

*Levulinic Acid Derivative of 9α-Fluoro-5α-Pregnane-11β,16α17α,21-Tetrol-3,20-Dione*

Following the procedure of Example 1 but substituting 10 g. of the levulinic acid derivative of triamcinolone acetonide, the levulinic acid derivative of 9α-fluoro-5α-pregnane-11β,16α,17α,21-tetrol-3,20-dione is obtained.

EXAMPLE 57

*Sodium Levulinate Derivative of 9α-Fluoro-5α-Pregnane-11β,16α,17α,21-Tetrol-3,20-Dione*

Following the procedure of Example 1 but substituting 10 g. the sodium levulinate derivative of triamcinolone for the triamcinolone acetonide, the sodium levulinate derivative of 9α-fluoro-5α-pregnane-11β,16α,17α,21-tetrol-3,20-dione is obtained.

EXAMPLE 58

*Methyl Glyoxylate Derivative of 9α-Fluoro-5α-Pregnane-11β,16α,17α,21-Tetrol-3,20-Dione*

Following the procedure of Example 1 but substituting 10 g. of the methyl glyoxylate derivative of triamcinolone for the triamcinolone acetonide, the methyl glyoxylate derivative of 9α-fluoro-5α-pregnane-11β,16α,17α,21-tetrol-3,20-dione is obtained.

EXAMPLE 59

*Ethyl Acetoacetate Derivative of 5α-Pregnane-11β,16α,17α,21-Tetrol-3,20-Dione*

Following the procedure of Example 1 but substituting 10 g. of the ethyl acetoacetate derivative of 16α-hydroxyhydrocortisone for the triamcinolone acetonide, the ethyl acetoacetate derivative of 5α-pregnane-11β,16α,17α,21-tetrol-3,20-dione is obtained.

EXAMPLE 60

*Ethyl Levulinate Derivative of 5α-Pregnane-11β,16α,17α,21-Tetrol-3,20-Dione*

Following the procedure of Example 1 but substituting 10 g. of the ethyl levulinate derivative of 16α-hydroxyprednisolone for the triamcinolone acetonide, the ethyl levulinate derivative of 5α-pregnane-11β,16α,17α,21-tetrol-3,20-dione is obtained.

EXAMPLE 61

*Ethyl Levulinate Derivative of 12α-Chloro-5α-Pregnane-16α,17α,21-Triol-3,11,20-Trione*

Following the procedure of Example 1 but substituting 10 g. of the ethyl levulinate derivative of 12α-chloro-16α-hydroxycortisone for the triamcinolone acetonide, the ethyl levulinate derivative of 12α-chloro-5α-pregnane-16α,17α,21-triol-3,11,20-trione is obtained.

EXAMPLE 62

*Ethyl Levulinate Derivative of 12α-Fluoro-5α-Pregnane-11β,16α,17α,21-Tetrol-3,20-Dione*

Following the procedure of Example 1 but substituting 10 g. of the ethyl levulinate derivative of 12α-fluoro-16α,hydroxyprednisolone for the triamcinolone acetonide, the ethyl levulinate derivative of 12α-fluoro-5α-pregnane-11β,16α,17α,21-tetrol-3,20-dione is obtained.

EXAMPLE 63

*Ethyl Pyruvate Derivative of 12α-Fluoro-5α-Pregnane-11β,16α,17α-Triol-3,20-Dione*

Following the procedure of Example 1 but substituting 10 g. of the ethyl pyruvate derivate of 12α-fluoro-Δ⁴-pregnene-11β,16α,17α-triol-3,20-dione for the triamcinolone acetonide, the ethyl pyruvate derivative of 12α-fluoro-5α-pregnane-11β,16α,17α-triol-3,20-dione is obtained.

EXAMPLE 64

*Ethyl Levulinate Derivative of 6α-Methyl-5α-Pregnane-11β,16α,17α,21-Tetrol-3,20-Dione*

Following the procedure of Example 1 but substituting 10 g. of the ethyl levulinate derivative of 6α-methyl-16α-hydroxyprednisolone for the triamcinolone acetonide, the ethyl levulinate derivative of 6α-methyl-5α-pregnane-11β,16α,17α,21-tetrol-3,20-dione is obtained.

EXAMPLE 65

*Ethyl Levulinate Derivative of 6α-Methyl-9α-Fluoro-5α-Pregnane-11β,16α,17α,21-Tetrol-3,20-Dione*

Following the procedure of Example 1 but substituting 10 g. of the ethyl levulinate derivative of 6α-methyl-9α-fluoro-16α-hydroxyprednisolone for the triamcinolone acetonide, the ethyl levulinate derivative of 6α-methyl-9α-fluoro-5α-pregnane-11β,16α,17α,21-tetrol-3,20-dione is obtained.

EXAMPLE 66

*9α-Fluoro-16α,17α-Isopropylidenedioxy-5α-Pregnane-11β,21-Diol-3,20-Dione 21-Acetate*

Following the procedure of Example 1 but substituting 10 g. of triamcinolone acetonide 21-acetate for the triamcinolone acetonide, 9α-fluoro-16α,17α-isopropylidenedioxy - 5α - pregnane-11β,21-diol-3,20-dione 21-acetate is obtained.

EXAMPLE 67

*Acetophenone Derivative of 9α-Fluoro-5α-Pregnane-11β,16α,17α,21-Tetrol-3,20-Dione 21-Acetate*

Following the procedure of Example 1 but substituting 10 g. of the acetophenone derivative of triamcinolone 21-acetate for the triamcinolone acetonide, the acetophenone derivative of 9α-fluoro-5α-pregnane-11β,16α,17α,21-tetrol-3,20-dione 21-acetate is obtained.

EXAMPLE 68

*16α,17α-Chloral Derivative of 9α-Fluoro-5α-Pregnane-11β,16α,17α,21-Tetrol-3,20-Dione 21-Hemisuccinic Acid*

Following the procedure of Example 1 but substituting 10 g. of the 16,17-chloral derivative of triamcinolone 21- hemisuccinic acid for the triamcinolone acetonide, the 16α,17α-chloral derivative of 9α-fluoro-5α-pregnane-11β,16α,17α,21-tetrol-3,20-dione 21-hemisuccinic acid is obtained.

EXAMPLE 69

*Ethyl Levulinate Derivative of 9α-Fluoro-5α-Pregnane-11β,16α,17α,21-Tetrol-3,20-Dione 21-Acetate*

Following the procedure of Example 1 but substituting 10 g. of the ethyl levulinate derivative of triamcinolone 21-acetate for the triamcinolone acetonide, the ethyl levulinate derivative of 9α-fluoro-5α-pregnane-11β,16α,17α,21-tetrol-3,20-dione 21-acetate is obtained.

EXAMPLE 70

*9α-Fluoro-16α,17α-Isopropylidenedioxy-5α-Pregnane-11β,21-Diol-3,20-Dione 21-Sodium Hemisuccinate*

(a) *Preparation of 9α-fluoro-16α,17α-isopropylidenedioxy-5α-pregnane-11β,21-diol-3,20-dione 21-hemisuccinic acid.*—A solution of 4 g. of 9α-fluoro-16α,17α-isopropylidenedioxy-5α-pregnane-11β,21-diol-3,20-dione and 8 g. of succinic anhydride in 40 ml. of anhydrous pyridine is heated at 60° for two hours. After cooling to 15°, 20 g. of ice is added and the mixture poured slowly with stirring onto 150 ml. of crushed ice, containing 16 ml. of concentrated sulfuric acid. The resulting precipitate of the 21-hemisuccinic acid is filtered and washed well with water until free from sulfuric acid.

(b) *Preparation of 9α-fluoro-16α,17α-isopropylidenedioxy-5α-pregnane-11β,21-diol-3,20-dione 21-sodium hemisuccinate.*—500 mg. of the 21-hemisuccinic acid obtained in step a is dissolved in a minimum of 95% alcohol and the resulting solution is neutralized with 0.1 N sodium hydroxide solution. The neutralized solution is freed from alcohol in vacuo, extracted with chloroform to remove residual unneutralized acid and the aqueous solution lyophilized in high vacuum. The residual material represents the pure soduim salt.

EXAMPLE 71

*9α-Fluoro-16α,17α-Isopropylidenedioxy-5α-Pregnane-11β,21-Diol-3,20-Dione 21-Sodium o-Hemiphthalate*

Following the procedure of Example 70 but substituting 10 g. of phthalic anhydride for the succinic anhydride in step a, there is obtained 9α-fluoro-16α,17α-isopropylidenedioxy-5α-pregnane-11β,21-diol-3,20-dione 21-sodium o-hemiphthalate.

EXAMPLE 72

*Acetophenone Derivative of 9α-Fluoro-5α-Pregnane-11α,16α,17α,21-Tetrol-3,20-Dione 21-Sodium Hemisuccinate*

Following the procedure of Example 70 but substituting 4 g. of the acetophenone derivative of 9α-fluoro-5α-pregnane-11β,16α,17α,21-tetrol-3,20-dione for the 9α-fluoro - 16α,17α - isopropylidenedioxy - 5α - pregnane-11β,21-diol-3,20-dione in step a, the acetophenone derivative of 9α-fluoro-5α-pregnane 11β,16α,17α,21-tetrol-3,20-dione 21-sodium hemisuccinate is obtained.

EXAMPLE 73

*9α - Floro-16α,17α - Isopropylidenedioxy - 5α - Pregnane-11β,-21-Diol-3,20-Dione 21-Potassium Hemiglutarate*

Following the procedure of Example 70 but substituting 10 g. of glutaric anhydride for the succinic anhydride in step a, and 0.1 N aqueous potassium hydroxide for the sodium hydroxide in step b, there is obtained 9α-fluoro-16α,17α - isopropylidenedioxy - 5α - pregnane - 11β,21-diol-3,20-dione 21-potassium hemiglutarate.

EXAMPLE 74

*9α,21-Difluoro-16α,17α-Isopropylidenedioxy-5α-Pregnane-11β-Ol 3,20-Dione*

Following the procedure of Example 1 but substituting 10 g. of 16α,17α-isopropylidene 9α,21-difluoro-$\Delta^{1,4}$-pregnadiene-11β,16α,17α-triol-3,20-dione for the triamcinolone acetonide, 9α,21-difluoro-16α,17α-isopropylidenedioxy-5α-pregnane-11β-ol-3,20-dione is obtained.

EXAMPLE 75

*9α-Fluoro-21-Chloro-16α,17α-Isopropylidenedioxy-5α-Pregnane-11β-Ol-3,20-Dione*

Following the procedure of Example 1 but substituting 10 g. of 9α-fluoro-21-chloro-$\Delta^{1,4}$-pregnadiene-11β,16α,17α-triol-3,20-dione 16,17-acetonide for the triamcinolone acetonide, 9α-fluoro-21-chloro-16α,17α-isopropylidenedioxy-5α-pregnane-11β-ol-3,20-dione is obtained.

EXAMPLE 76

*Bis-(9α-Fluoro-16α,17α-Isopropylidenedioxy-5-Pregnane-11β,21-Diol-3,20-Dione) 21,21'-Sulfite*

Following the procedure of Example 1 but substituting 10 g. of bis-(triamcinolone 16,17-acetonide) 21,21'-sulfite for the triamcinolone acetonide, bis-(9α-fluoro-16α,17α - isopropylidenedioxy - 5α - pregnane - 11β,21-diol-3,20-dione) 21,21'-sulfite is obtained.

EXAMPLE 77

*Bis-(9α-Fluoro-16α,17α-Isopropylidenedioxy-5α-Pregnane-11β,21-Diol-3,20-Dione) 21,21'-Carbonate*

Following the procedure of Example 1 but substituting 10 g. of bis-(triamcinolone 16α,17α-acetonide) 21,21'-carbonate for the triamcinolone acetonide, bis-(9α-fluoro-16α,17α - isopropylidenedioxy - 5α - pregnane - 11β,21-diol-3,20-dione) 21,21'-carbonate is obtained.

EXAMPLE 78

*Bis-(9α-Fluoro-16α,17α-Isopropylidenedioxy-5α-Pregnane-11β,21-Diol-3,20-Dione) 21,21'-Sulfate*

Following the procedure of Example 1 but substituting 10 g. of bis-(triamcinolone 16α,17α-acetonide) 21,21'-sulfate for the triamcinolone acetonide, bis-(9α-fluoro-16α,17α - isopropylidenedioxy - 5α - pregnane - 11β,21-diol-3,20-dione) 21,21'-sulfate is obtained.

EXAMPLE 79

*Bis-(9α,Fluoro-16α,17α-Isopropylidenedioxy-5α-Pregnane-11β,21-Diol-3,20-dione) 21,21'-Phenylphosphonate*

Following the procedure of Example 1 but substituting 10 g. of bis-(triamcinolone 16α,17α-acetonide) 21,21'-phenylphosphonate for the triamcinolone acetonide, bis-(9α - fluoro - 16α,17α - isopropylidenedioxy) - 5α - pregnane-11β,21-diol-3,20-dione) 21,21'-phenylphosphonate is obtained.

EXAMPLE 80

*9α-Fluoro-16α,17α-Isopropylidenedioxy-5α-Pregnane-11β,21-Diol-3,20-Dione 21-Potassium Phosphate*

To a mixture of 3 ml. of anhydrous pyridine and 0.15 ml. of phosphorous oxychloride maintained at —15° is added dropwise over a ten minute period to a solution of 200 ml. of 9α-fluoro-16α,17α-isopropylidenedioxy-5α-pregnane-11β,21-diol-3,20-dione in 3 ml. of pyridine. The resulting solution is allowed to remain at —15° for an additional 20 minutes at which time 0.2 ml. of water is added and the mixture is allowed to warm up to room temperature. One hour after the addition of water, the solution is concentrated in vacuo to about 2 ml., diluted with 10 ml. of water, extracted with chloroform and adjusted to a pH of 6.8 with potassium carbonate solution. The neutralized solution is lyophilized, triturated with alcohol and the alcoholic solution concentrated to small volume. The potassium salt of 9α-fluoro-16α,17α-isopropylidenedioxy - 5α - pregnane-11β,21-diol-3,20-dione 21-phosphate crystallizes under these conditions.

EXAMPLE 81

*6α,9α-Difluoro-16α,17α-Isopropylidenedioxy-5α-Pregnane-11β-21-Diol-3,20-Diol*

Following the procedure of Example 1 but substituting 10 g. of 6α-fluorotriamcinolone acetonide for the triamcinolone acetonide, 6α,9α-difluoro-16α,17α-isopropylidenedioxy-5α-pregnane - 11β,21 - diol-3,20-dione is obtained.

EXAMPLE 82

*6α,9α-Difluoro-16α,17α-Isopropylidenedioxy-5α-Pregnane-11β,21-Diol-3,20-Dione 21-Acetate*

Following the procedure of Example 1 but substituting 10 g. of 16α,17α-isopropylidene 6α-fluorotriamcinolone 21-acetate for the triamcinolone acetonide, 6α,9α-difluoro-16α,17α-isopropylidene dioxy - 5α - pregnane-11β,21-diol-3,20-dione 21-acetate is obtained.

EXAMPLE 83

*6α,9α-Difluoro-16α,17α-(2'-Butylidenedioxy)-5α-Pregnane-11β,21-Diol-3,20-Dione*

Following the procedure of Example 1 but substituting 10 g. of 16α,17α-(2'-butylidene) 6α-fluorotriamcinolone for the triamcinolone acetonide, 6α,9α-difluoro-16α,17α-(2'-butylidenedioxy) - 5α-pregnane-11β,21-diol-3,20-dione is obtained.

EXAMPLE 84

*6α,9α-Difluoro-16α,17α-(4'-Methyl-2'-Pentylidenedioxy)-5α-Pregnane-11β,21-Diol-3,20-Dione*

Following the procedure of Example 1 but substituting 10 g. of 16α,17α(4'-methyl-2'-pentylidene) 6α-fluorotriamcinolone for the triamcinolone acetonide, 6α,9α-difluoro - 16α,17α - (4'-methyl - 2' - pentylidenedioxy)-5α-pregnane-11β,21-diol-3,20-dione is obtained.

EXAMPLE 85

*6α,9α-Difluoro-16α,17α-Cyclohexylidenedioxy-5α-Pregnane-11α,21-Diol-3,20-Dione*

Following the procedure of Example 1 but substituting 10 g. of 16α,17α-cyclohexylidene 6α-fluorotriamcinolone for the triamcinolone acetonide, 6α,9α-difluoro-16α,17α-cyclohexylidenedioxy - 5α - pregnane-11β,21 - diol-3,20-dione is obtained.

EXAMPLE 86

*6α,9α-Difluoro-16α,17α-(3'-Pentylidenedioxy)5α-Pregnane-11β,21-Diol-3,20-Dione*

Following the procedure of Example 1 but substituting 10 g. of 16α,17α(3'-pentylidene) 6α-fluorotriamcinolone for the triamcinolone acetonide, 6α,9α-difluoro-16α,17α-(3'-pentylidenedioxy)-5α-pregnane - 11β,21 - diol - 3,20-dione is obtained.

EXAMPLE 87

*6α,9α-Difluoro-16α,17α-Ethylidenedioxy-5α-Pregnane-11β,21-Diol-3,20-Dione*

Following the procedure of Example 1 but substituting 10 g. of 16α,17α-ethylidene 6α-fluorotriamcinolone for the triamcinolone acetonide, 6α,9α-difluoro - 16α,17α - ethylidenedioxy-5α-pregnane - 11β,21 - diol - 3,20-dione is obtained.

EXAMPLE 88

*6α-Fluoro-16α,17α-Isopropylidenedioxy-5α-Pregnane-11β,21-Diol-3,20-Dione*

Following the procedure of Example 1 but substituting 10 g. of 16α,17α-isopropylidene 6α-fluoro-16α-hydroxyprednisolone for the triamcinolone acetonide, 6α-fluoro-16α,17α - isopropylidenedioxy - 5α - pregnane - 11β,21-diol-3,20-dione is obtained.

EXAMPLE 89

*6α-Fluoro-9α-Methyl-16α,17α-Isopropylidenedioxy-5α-Pregnane-11β,21-Diol-3,20-Dione*

Following the procedure of Example 1 but substituting 10 g. of 16α,17α-isopropylidene 6α-fluoro-9α-methyl-16α-hydroxyprednisolone for the triamcinolone acetonide, 6α-fluoro-9α-methyl-16α,17α - isopropylidenedioxy - 5α-pregnane-11β,21-diol-3,20-dione is obtained.

EXAMPLE 90

*6α,9α-Difluoro-12α-Methyl-16α,17α-Isopropylidenedioxy-5α-Pregane-11β,21-Diol-3,20-Dione*

Following the procedure of Example 1 but substituting 10 g. of 16α,17α-isopropylidene 6α,9α-difluoro-12α-methyl-16α-hydroxyhydrocortisone for the triamcinolone acetonide, 6α,9α - difluoro - 12α-methyl - 16α,17α-isopropylidenedioxy-5α-pregnane - 11β,21 - diol-3,20-dione is obtained.

EXAMPLE 91

*6α,9α-Difluoro-16α,17α-Isopropylidenedioxy-5α-Pregnane-11β-Ol-3,20-Dione*

Following the procedure of Example 1 but substituting 10 g. of 16α,17α-isopropylidene 6α,9α-difluoro-Δ$^{1,4}$-pregnadiene-11β,16α,17α-triol-3,20-dione for the triamcinolone acetonide, 6α,9α-difluoro - 16α,17α - isopropylidenedioxy-5α-pregnane-11β-ol-3,20-dione is obtained.

EXAMPLE 92

*16α,17α-Chloral Derivative of 6α,9α-Difluoro-5α-Pregnane-11β,16α,17α,21-Tetrol-3,20-Dione*

Following the procedure of Example 1 but substituting 10 g. of the 16α,17α-chloral derivative of 6α-fluorotriamcinolone for the triamcinolone acetonide, the 16α,17α-chloral derivative of 6α,9α-difluoro-5α-pregnane-11β,16α,17α,21-tetrol-3,20-dione is obtained.

EXAMPLE 93

*Acetophenone Derivative of 6α,9α-Difluoro-5α-Pregnane-11β,16α,17α,21-Tetrol-3,20-Dione*

Following the procedure of Example 1 but substituting 10 g. of the acetophenone derivative of 6α-fluorotriamcinolone for the triamcinolone acetonide, the acetophenone derivative of 6α,9α-difluoro-5α-pregnane-11β,16α,17α,21-tetrol-3,20-dione is obtained.

EXAMPLE 94

*Acetophenone Derivative of 6α,9α-Difluoro-5α-Pregnane-11β,16α,17α,21-Tetrol-3,20-Dione-21-Acetate*

Following the procedure of Example 1 but substituting 10 g. of the acetophenone derivative of 6α-fluorotriamcinolone 21-acetate for the triamcinolone acetonide, the acetophenone derivative of 6α,9α-difluoro-5α-pregnane-11β,16α,17α,21-tetrol-3,20-dione 21-acetate is obtained.

EXAMPLE 95

*Alloxan Derivative of 6α,9α-Difluroro-5α-Pregnane-11β,16α,17α,21-Tetrol-3,20-Dione*

Following the procedure of Example 1 but substituting 10 g. of the 16α,17α-alloxan derivative of 6α-fluorotriamcinolone for the triamcinolone acetonide, the alloxan derivative of 6α,9α-difluoro-5α-pregnane-11β,16α,17α,21-tertol-3,20-dione is obtained.

EXAMPLE 96

*Dicyclopropyl Ketone Derivative of 6α,9α-Difluroro-5α-Pregnane-11β,16α,17α,21-Tetrol-3,20-Dione*

Following the procedure of Example 1 but substituting 10 g. of the dicyclopropyl ketone derivative of 6α-fluorotriamcinolone for the triamcinolone acetonide, the dicyclopropyl ketone derivative of 6α,9α-difluoro-5α-pregnane-11β,16α,17α,21-tetrol-3,20-dione is obtained.

EXAMPLE 97

*6α-Chloro-9α-Fluoro-16α,17α-Isoproylidenedioxy-5α-Pregnane-11β,21-Diol-3,20-Dione*

Following the procedure of Example 1 but substituting 10 g. of 6α-chloro-9α-fluoro-16α-hydroxyhydrocortisone acetonide for the triamcinolone acetonide, 6α-chloro-9α-fluoro - 16α,17α - isoproylidenedioxy - 5α - pregnane-11β,21-diol-3,20-dione is obtained.

The compounds of this invention can also be prepared by the second process of this invention, which is applicable for the preparation of all the compounds of this invention. This process is illustrated by the following example employing 16α-hydroxyhydrocortisone as the starting material.

EXAMPLE 98

16α,17α - Isopropylidenedioxy - 5α - Pregnane - 11β,21-Diol-3,20-Dione (a) *Preparation of 5α-pregnane-11β,16α,17α,21-tetrol-3,20-dione.*—Following the procedure of Example 1 but substituting 9 g. of 16α-hydroxyhydrocortisone for the triamcinolone acetonide, 5α-pregnane-11β,16α,17α,21-tetrol-3,20-dione is obtained.

(b) *Preparation of 16α,17α-isopropylidinedioxy-5α-pregnane-11β,21-diol-3,20-dione.*—To a suspension of 500 mg. of 5α-pregnane-11β,16α,17α,21-tetrol-3,20-dione in 75 ml. of acetone is added 0.05 ml. of 72% perchloric acid and the mixture is agitated at room temperature for three hours. The mixture is then neutralized with dilute bicarbonate and the acetone removed in vacuo. The resulting crystalline suspension is filtered and the crystals washed with water.

This invention may be variously otherwise embodied within the scope of the appended claims.

What is claimed is:

1. A compound selected from the group consisting of steroids of the general formula

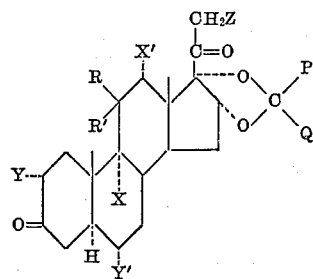

wherein R is hydrogen, R' is β-hydroxy and together R and R' is keto; and X' are each selected from the group consisting of hydrogen, chloro, fluoro and lower alkyl, at least one of the substituents X and X' being selected from the group consisting of hydrogen and lower alkyl; Y is selected from the group consisting of hydrogen and methyl; Y' is selected fom the group consisting of hydrogen, halogen, and lower alkyl; Z is selected from the group consisting of hydrogen, chloro, fluoro, hydroxy and acyloxy; P is selected from the group consisting of hydrogen, lower alkyl, halo lower alkyl, carboxy lower alkyl, monocyclic cycloalkyl, monocyclic aryl, monocyclic aryl lower alkyl, monocyclic heterocyclic and monocyclic heterocyclic lower alkyl; Q is selected from the group consisting of lower alkyl, halo lower alkyl, carboxy lower alkyl, monocyclic cycloalkyl, monocyclic aryl, monocyclic aryl lower alkyl, monocyclic heterocyclic and monocyclic heterocyclic lower alkyl; and together with the carbon to which they are joined P and Q are selected from the group consisting of cycloalkyl and monocyclic heterocyclic.

2. 16α,17α-lower alkylidene 9α-fluoro-5α-pregnane-11β,16α,17α,21-tetrol-3,20-dione, wherein the alkylidene radical contains at least two carbon atoms.

3. 9α - fluoro - 16α,17α - isopropylidenedioxy - 5α-pregnane-11a,21-diol-3,20-dione.

4. 16α,17α-lower alkylidene 6α,9α-difluoro-5α-pregnane-11β,16α,17α,21-tetrol-3,20-dione, wherein the alkylidene radical contains at least two carbon atoms.

5. 6α,9α - difluoro - 16α,17α - isopropylidenedioxy-5α-pregnane-11β,21-diol-3,20-dione.

6. 16α,17α-lower alkylidene 12α-fluoro-5α-pregnane-11β,16α,17α,21-tetrol-3,20-dione, wherein the alkylidene radical contains at least two carbon atoms.

7. 12α - fluoro - 16α,17α - isopropylidenedioxy - 5α-pregnane-11β,21-diol-3,20-dione.

8. 9α - fluoro - 5α - pregnane - 11β,16α,17α - tetrol-3,20-dione 16,17-acetophenonide.

9. 6α - fluoro - 16α,17α - isopropylidenedioxy - 5α-pregnane-11β,21-diol-3,20-dione.

References Cited in the file of this patent

UNITED STATES PATENTS 2,751,399    Fonken _____ June 19, 1956

OTHER REFERENCES

Bernstein et al., J.A.C.S., vol. 81 (Sept. 5, 1959), pp. 4573 and 4574.

UNITED STATES PATENT OFFICE
CERTIFICATE OF CORRECTION

Patent No. 3,053,836                      September 11, 1962

Josef Fried

It is hereby certified that error appears in the above numbered patent requiring correction and that the said Letters Patent should read as corrected below.

Column 1, line 58, strike out "and R' are keto; X and X' are hydrogen, chloro, fluoro"; column 6, line 48, for "uantitative" read -- quantitative --; column 8, line 5, after "Example" insert -- 1 --; lines 21 and 22, for "16α,17α-(3'-Pentylidenedioxy)-12α-Chloro-5α-Pregnane-11β-Ol-3,20-Dione", in italics, read -- 9α-Fluoro-16α,17α-Isopropylidenedioxy-5α-Pregnane-11β-Ol-3,20-Dione --, in italics; column 19, line 46, after "keto;" insert -- X --; column 20, line 24, for "11α" read -- 11β --.

Signed and sealed this 5th day of February 1963.

(SEAL)
Attest:

ERNEST W. SWIDER
Attesting Officer

DAVID L. LADD
Commissioner of Patents